Figure 1:
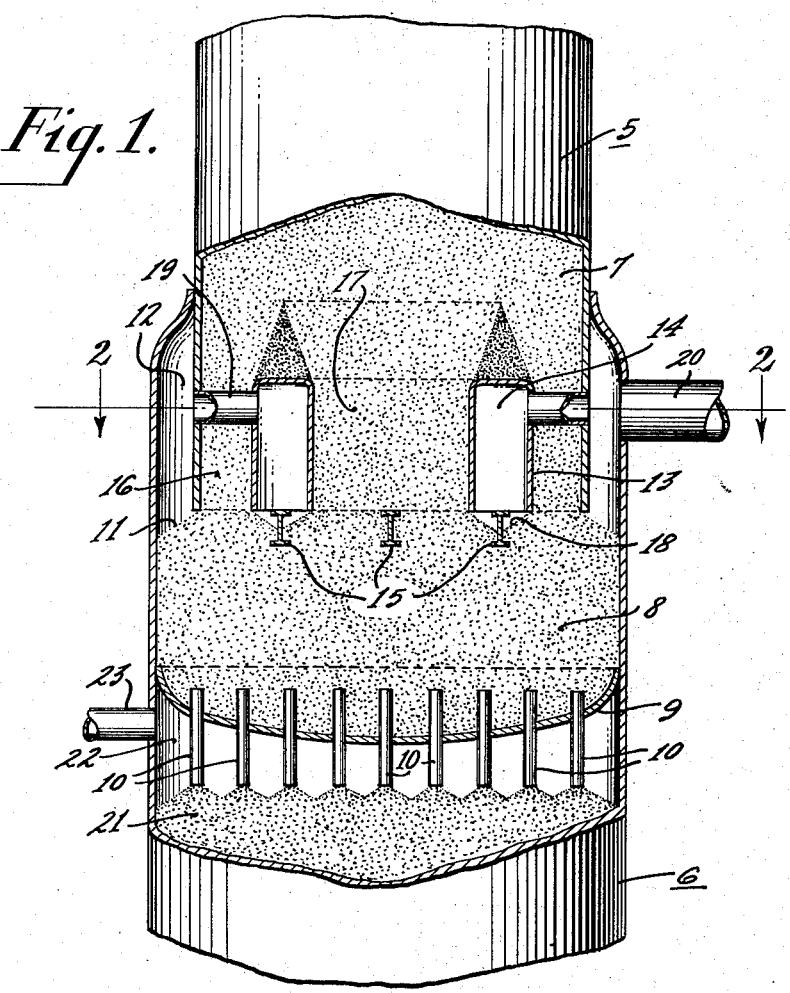

Oct. 21, 1958 R. E. ASHWILL 2,857,327
DISENGAGEMENT OF GASES FROM FLUENT SOLID PARTICLES
Filed Jan. 30, 1953

INVENTOR:
Richard E. Ashwill
BY William Klabunde
ATTORNEY

United States Patent Office 2,857,327
Patented Oct. 21, 1958

2,857,327

DISENGAGEMENT OF GASES FROM FLUENT SOLID PARTICLES

Richard E. Ashwill, Wilmington, Del., assignor to Houdry Process Corporation, Wilmington, Del., a corporation of Delaware Application January 30, 1953, Serial No. 334,181

5 Claims. (Cl. 208—168)

This invention relates to improvements in the handling of gravitating compact bodies of granular material employed as contact masses in hydrocarbon conversion systems. The invention is of particular application to those systems wherein gaseous material is made to flow concurrently through a compact moving bed of granular contact material, such as beads or pellets of catalyst having a particle size in the range of about 1–15, and preferably about 2–8, millimeters in diameter, at relatively-high space velocities.

Under such conditions of concurrent gas-solids flow and high space rate, the problems of disengaging the granular material from the gaseous reaction products upon discharge from the reaction zone, and of maintaining uniformity of flow of the granular material are of particular importance.

In the application of John W. Barker, Serial No. 81,202, now U. S. Patent No. 2,647,859 for "Disengagement of Gases From Fluent Solid Particles" there is disclosed a typical system to which the present invention is applicable, wherein contact material gravitating as a compact moving bed through a reaction zone is discharged from the lower end thereof as an annular stream and deposited directly onto an expanded moving bed of the granular material maintained in an enlarged disengaging zone surrounding the lower end of and extending below the reaction zone. The moving mass of granular material confined within the reactor vessel is caused to flow as an annular stream at least in the bottom region of the reaction zone by a hollow member positioned axially within the reactor and arranged to divert the granular material toward the peripheral region thereof. The hollow member is open at the bottom so as to provide a gas-collecting space for gases disengaged from the internal exposed surface of the granular material formed by its inward flow under the hollow member to form the horizontally continuous expanded bed. The outer portion of the annular stream expands outwardly upon discharge to fill the enlarged disengaging zone the peripheral region of the expanded bed having an exposed surface forming the lowermost boundary of an annular gas-collecting plenum formed between the spaced interengaging end portions of the reactor and disengager vessel members. Lateral conduits convey the gas collected within the hollow member through the annular stream of granular material and into the outer gas-collecting plenum, from which the total gas is subsequently discharged.

It has been found through experience, however, that uniformity of flow throughout the cross-sectional area of the moving bed of granular material is difficult to obtain when there is a central obstruction of any substantial size in the bottom region of the bed, especially when the bed is not of considerable depth. As known to those experienced in the art, there is a limiting angle of solids movement or flow from a supported mass or bed of granular material when the solids are withdrawn from the bottom of the mass through a restricted opening. Such angle, for the particular type of material under consideration, is approximately 70° to the horizontal, and the granular material outside the zone of solids movement is relatively static. The greater the area or areas of non-moving solids at the bottom of the bed the greater the distance upwardly within the bed at which there will be a non-uniform pattern of flow measured horizontally across the bed. Thus, in a relatively shallow bed there may be non-uniform flow at all levels within the bed.

When solids are withdrawn from the bottom of a bed along an annular path whose inner diameter is relatively large, the cone of relatively slow-moving and of static particles formed above the center of the annular opening will extend a substantial distance upwardly into the bed.

In accordance with the present invention, the disadvantages attendant upon such withdrawal are overcome by providing a downwardly moving confined stream or column of solids axially within and radially spaced from the downwardly moving confined annular stream. The granular material is diverted inwardly and outwardly from the annular space between the outer and inner streams and, after a relatively short distance of travel downward as separate streams, the confined streams are merged to form an enlarged second bed. Solids in the central stream flow outwardly, and solids in the annular stream flow both outwardly and inwardly, at the angle of repose for the particular granular material as they spread out over the surface of the second bed. The continuous exposed surface of solids formed by the juncture of the granular material flowing at the bottom of the annular confined space provides an internal disengaging surface for escape of the gaseous material from the bed, and the continuous annular exposed surface of solids formed by the granular material flowing outwardly from the lower outer periphery of the annular path provides an external disengaging surface for escape of the gaseous material.

Gas disengaged at the inner exposed surface is collected in said annular space and is conveyed therefrom as at least one confined stream laterally through the annular stream of solids. The gas disengaged at the outer exposed surface is collected in a confined zone contiguous thereto which receives also the gas conveyed from the above-mentioned annular space. The total collected gas is then discharged from the outer confined zone.

The annular solids-free space formed by diverting the flow of granular material in the lower region of the first bed into separate annular and solid streams is of narrow horizontal dimension, so that there will be no substantial depth of relatively-static or stagnant solids formed immediately above the uppermost boundary of the confined annular space.

In a preferred embodiment of the invention, such operation is effected by passing the first bed of granular material downwardly through a cylindrical vessel having its open lower end inserted partially and concentrically within a larger cylindrical vessel, and diverting the flow of solids at the lower end of the first vessel into an outer annular stream and an inner solid stream by placing an inverted channel ring in the bottom of the first vessel. Horizontal conduits join the annular hollow space beneath the channel ring with the annular hollow space formed between the telescoping ends of the two vessels.

The lower perimeter of the channel ring may be at a common level with the lower perimeter of the first vessel, or it may be at a higher level within the bed comprising the contact zone. In the latter case, the relative quantities of gas disengaged into the channel ring and into the surrounding annular space or plenum may be controlled by suitable orifices placed in the gas-conveying conduits joining the two annular spaces.

Figure 2:
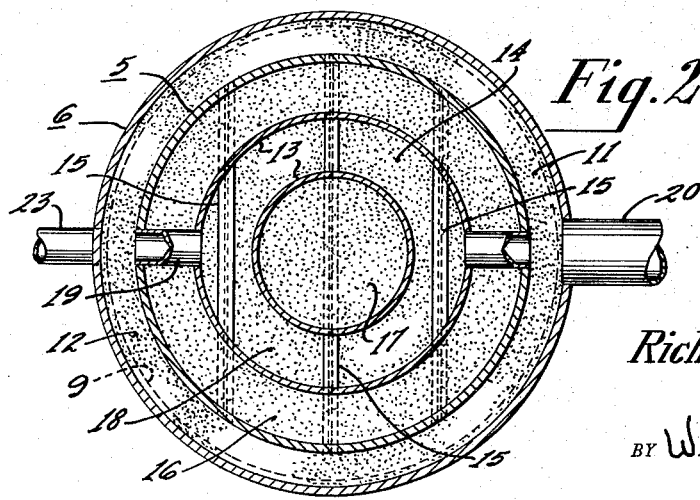

For a fuller understanding of the invention, reference may be had to the following description and claims taken in connection with the accompanying drawing forming a part of this application, in which:

Figure 1 is a fragmentary section of a gas-solids contact apparatus, showing in elevation one embodiment of the disengager and its relationship to a typical concurrent-flow contact chamber and an expanded disengaging and purging section at the bottom of the contact chamber; and Figure 2 is a horizontal section taken along the line 2—2 of Figure 1.

Referring to the drawing, the numeral 5 designates a cylindrical reaction or contact vessel, only the lower portion of which is illustrated. In known manner, granular contact material in the form of beads, pellets, etc. of a particle size in the order of about 1–15, and preferably 2–8, millimeters in diameter is continuously introduced at the upper end of cylindrical vessel 5, and gravitates therethrough into and through an enlarged cylindrical vessel 6 whose upper end portion concentrically contains the lower end portion of vessel 5.

Continuous withdrawal of the granular material from the bottom of vessel 6 is so controlled that the granular material gravitates through both vessels as a compact moving mass. The compact mass flows as separate broad columns or beds, 7 and 8 respectively, in both the contact chamber or zone of vessel 5 and the disengaging and purging chamber or zone at the upper end of vessel 6. Bed 8 is supported upon a transverse tube-sheet 9 containing a plurality of solids discharge nipples 10, also referred to herein as purge nipples.

Bed 7 comprises the reaction or contact zone. Gaseous material, such as hydrocarbons to be converted, is passed concurrently downward through the moving bed under conditions of high temperature, etc. suitable to effect the desired conversion. The reactants may be introduced into the reactor entirely in the gaseous state, or they may comprise gaseous and liquid components, the latter to be vaporized in known manner by contact with the high-temperature granular material.

Bed 8 comprises the disengaging and purging zone, wherein the gaseous reaction products formed in bed 7 are disengaged from the contact material. Disengagement of the gas is effected at exposed surfaces of the bed 8, one of which is formed by the contact material as it flows outwardly upon discharge into the peripheral region of the larger vessel 6. There is thus formed an annular exposed surface area 11 of contact material inclined at the angle of repose for the particular material. Surface area 11 forms the lowermost boundary of the annular plenum or gas-collecting chamber 12 formed between the spaced sides of vessels 5 and 6. The upper end of vessel 6 is turned inwardly and joins the outer wall of vessel 5 so as to close the top of the plenum 12.

Centrally within the lower region of bed 7 there is placed an inverted channel-ring 13 whose hollow portion forms an internal annular gas-collecting chamber 14. Channel-ring 13 is of relatively narrow width, in order that the area of its uppermost surface will not be sufficient to form a zone of static granular material extending for an undesirable distance upwardly within the bed 7. The lower edges of the channel-ring 13 rest upon horizontal support beams 15 extending across the vessel 5 and secured thereto at their ends.

Channel-ring 13 may be arranged with its lower edges at a comon level with the lower edge of vessel 5, which arrangement is illustrated and in most cases preferred, or it may be set higher within the vessel 5 or extend downwardly below the lower end thereof. Where conditions make it desirable to locate the disengaging perimeters of vessel 5 and channel-ring 13 at different levels, compensation for pressure drop differences down through the bed 7 to the respective levels may be made in known manner, as will presently be described.

At the bottom of bed 7 the flow of contact material is split by channel-ring 13 into an outer annular compact moving column 16 and an inner circular column 17. After passing through and around the channel-ring the columns of granular material flow together, forming the annular internal exposed surface of solids 18 beneath the channel-ring. Surface 18 is inclined to the horizontal at the angle of repose, as is annular surface 11, and provides an internal disengaging surface. Gas disengaged at surface 18 is collected in the annular hollow space 14 within the channel ring, and is continuously conveyed therefrom through lateral conduits 19 into the annular plenum 12. The total gaseous effluent is thereafter withdrawn from plenum 12 through outlet conduit 20.

As stated, channel-ring 13 may be set in the bed 7 at a level which will cause the lower channel-ring perimeters to be located above the lower end of vessel 5. In such case, the relative quantities of gas which may be disengaged through the channel-ring and through the annular plenum 12 may be controlled by employing suitable orifices in the lateral transfer conduits 19. It is contemplated that the width of the annular space 12 and the annular space 14 will be such as to provide the optimum proportion between the disengaging surfaces 11 and 18, without detrimentally affecting the smooth flow of solids in the upper regions of bed 7.

The granular material discharging from bed 8 through purge nipples 10 again forms a compact moving bed 21 below the tube-sheet 9, the surface of the bed 21 being irregular and inclined at the angle of repose around the discharge end of each nipple. The surface of bed 21 is spaced from the underside of tube-sheet 9 so as to provide a manifold space 22 into which purge gas, such as steam, is introduced through inlet conduit 23.

The purge gas enters bed 21 through its irregular exposed surface and, reversing its general direction of flow, passes upwardly through the compact columns of granular material descending in purge nipples 10. The purge gas then passes upwardly through bed 8 and displaces gaseous reaction products which may have been formed therein or been carried by the granular material past the aforementioned disengaging level or levels. The purge gas also is disengaged at exposed surfaces 11 and 18, and is removed from the system with the gaseous reaction products through outlet conduit 20.

The concentricity of the vessels 5 and 6 and the channel-ring 13 is clearly illustrated in Figure 2, as is also the positional relationship of the supporting beams 15 and the transfer conduits 19, two of which have been illustrated although more may be employed, if desired.

By means of the present invention it is possible to relieve the peripheral surface region of the bed of a substantial portion of the disengaging load which it would otherwise take alone. Internal disengagement is thus made possible without serious adverse effect upon the velocity gradient across the bed of the contact zone at levels relatively close to the disengaging levels.

Obviously many modifications and variations of the invention as hereinbefore set forth may be made without departing from the spirit and scope thereof, and therefore only such limitations should be imposed as are indicated in the appended claims.

What is claimed is:

1. In a hydrocarbon conversion process in which gaseous hydrocarbons and granular contact material in the form of a compact moving bed are passed downwardly through a conversion zone and are discharged throughout the entire bottom area thereof within a larger disengaging and purging zone wherein said contact material directly forms an expanded compact moving bed having a peripheral annular exposed surface; in which said contact material is discharged at the bottom of said larger zone; and in which purging gas is passed upwardly through said expanded bed to be disengaged, together with the gaseous hydrocarbons from said conversion zone, at the junction of said zones; the improved method of disengaging said gaseous material from said contact material which comprises the steps of: diverting the flow of said contact material within the bottom region of said conversion zone so as to form an axial core and a peripheral annulus of compactly flowing contact material and to provide an internal annular exposed surface of contact material where said core and said annulus unite to form said expanded bed; disengaging portions of the total gaseous material at each of said annular exposed surfaces and separately collecting the gaseous material within internal and peripheral gas-collecting plenums coextensive with said exposed surfaces; passing the gaseous material collected within said internal plenum laterally through said annulus of contact material to said peripheral plenum; and discharging the total gaseous material from said peripheral plenum.

2. The method defined in claim 1, in which said core and said annulus of contact material are of substantially equal cross-sectional area.

3. In a hydrocarbon conversion system including an upper open-bottom cylindrical vessel having its lower end centrally positioned partly within a lower larger vessel, said vessels being adapted to contain a continuous compact moving mass of granular contact material; means for introducing gaseous hydrocarbons into the upper end of said upper vessel; means for introducing a gaseous purging medium into the lower region of said mass for countercurrent flow through said lower vessel; and means for discharging gaseous material from the annular space formed between the horizontally-spaced sides of said vessels; the combination therewith of: an internal inverted channel-ring concentrically positional within the bottom region of said upper vessel and adapted to provide an axial path of circular cross section and a peripheral path of annular cross section for said contact material in the bottom region of said upper vessel, whereby said mass of contact material in entering said lower vessel expands to form both peripheral and internal annular exposed surfaces of said mass beneath said channel-ring and at the bottom of said annular space, respectively; and conduit means connecting the space within said channel-ring with said annular space.

4. Apparatus as defined in claim 3 in which said axial path and said annular peripheral path in the lower region of said upper vessel have substantially equal flow areas.

5. Apparatus as defined in claim 3 in which the level of the lowermost edges of said inverted channel-ring is above the level of the lower end of said upper vessel, and in which said conduit means is adapted for controlled flow of gaseous material therethrough in accordance with pressure differences between said levels.

References Cited in the file of this patent

UNITED STATES PATENTS

| | | |
|---|---|---|
| 2,386,670 | Evans | Oct. 9, 1945 |
| 2,487,961 | Angell | Nov. 15, 1949 |
| 2,577,791 | McKinney | Nov. 11, 1951 |
| 2,599,568 | McKinney | June 10, 1952 |
| 2,647,859 | Barker | Aug. 4, 1953 |